US012781318B2

(12) United States Patent
Otani

(10) Patent No.: US 12,781,318 B2
(45) Date of Patent: Nov. 3, 2026

(54) OIL RING WIRE

(71) Applicant: TOKUSEN KOGYO CO., LTD., Ono (JP)

(72) Inventor: Kei Otani, Kobe (JP)

(73) Assignee: TOKUSEN KOGYO CO., LTD., Ono (JP)

( * ) Notice: Subject to any disclaimer, the term of this patent is extended or adjusted under 35 U.S.C. 154(b) by 381 days.

(21) Appl. No.: 18/274,763

(22) PCT Filed: Dec. 27, 2021

(86) PCT No.: PCT/JP2021/048637
§ 371 (c)(1),
(2) Date: Jul. 28, 2023

(87) PCT Pub. No.: WO2022/219854
PCT Pub. Date: Oct. 20, 2022

(65) Prior Publication Data
US 2024/0026972 A1 Jan. 25, 2024

(30) Foreign Application Priority Data
Apr. 12, 2021 (JP) ................................ 2021-067235

(51) Int. Cl.
*C22C 38/42* (2006.01)
*C21D 1/18* (2006.01)
*C21D 6/00* (2006.01)
*C21D 8/00* (2006.01)
*C21D 9/40* (2006.01)
*C22C 38/02* (2006.01)
(Continued)

(52) U.S. Cl.
CPC ................ *C22C 38/02* (2013.01); *C21D 1/18* (2013.01); *C21D 6/004* (2013.01); *C21D 6/005* (2013.01); *C21D 6/008* (2013.01); *C21D 8/00* (2013.01); *C21D 9/40* (2013.01); *C22C 38/04* (2013.01); *C22C 38/34* (2013.01); *C22C 38/42* (2013.01); *C22C 38/46* (2013.01); *F16J 9/26* (2013.01)

(58) Field of Classification Search
None
See application file for complete search history.

(56) References Cited

U.S. PATENT DOCUMENTS

2006/0225819 A1* 10/2006 Yoshihara ............... C22C 38/42 420/104
2018/0259022 A1 9/2018 Teramoto et al.
2020/0063228 A1 2/2020 Kim et al.

FOREIGN PATENT DOCUMENTS

EP 3006787 A1 * 4/2016 ................ B21J 5/00
JP 2000-282177 A 10/2000
(Continued)

OTHER PUBLICATIONS

Office Action issued Jun. 10, 2026 in Chinese Application No. 202180094895.8.

*Primary Examiner* — Jenny R Wu
(74) *Attorney, Agent, or Firm* — Sughrue Mion, PLLC

(57) ABSTRACT

An oil ring wire (2) contains an alloy steel as a material. The alloy steel contains: 0.50 to 0.65% by mass C; 1.60 to 2.30% by mass Si; 0.60 to 1.10% by mass Mn; 0.75 to 1.15% by mass Cr; 0.18 to 0.45% by mass Ni; 0.05 to 0.15% by mass V; 0.15% by mass or less Cu; and inevitable impurities. In the oil ring wire (2), an area percentage of a carbide is more than 6.0% and 10.0% or less. Also disclosed is a method of producing the oil ring wire.

4 Claims, 8 Drawing Sheets

(51) Int. Cl.

| | |
|---|---|
| ***C22C 38/04*** | (2006.01) |
| ***C22C 38/34*** | (2006.01) |
| ***C22C 38/46*** | (2006.01) |
| *F16J 9/26* | (2006.01) |

(56) References Cited

FOREIGN PATENT DOCUMENTS

| | | | | |
|---|---|---|---|---|
| JP | 2007092843 | A | * | 4/2007 |
| JP | 2008-50649 | A | | 3/2008 |
| JP | 2012149765 | A | * | 8/2012 |
| JP | 2015-110841 | A | | 6/2015 |
| JP | 2018062690 | A | * | 4/2018 |

* cited by examiner

OIL RING WIRE

CROSS REFERENCE TO RELATED APPLICATIONS

This application is a National Stage of International Application No. PCT/JP2021/048637 filed on Dec. 27, 2021, claiming priority based on Japanese Patent Application No. 2021-067235 filed on Apr. 12, 2021.

TECHNICAL FIELD

The present invention relates to a wire for an oil ring mounted on a piston of an internal combustion engine. In particular, the present invention relates to a wire suitable, for example, for a two-piece combined oil ring.

BACKGROUND ART

An internal combustion engine includes a cylinder, a piston, a pressure ring, and an oil ring. The pressure ring and the oil ring are mounted on the piston. The pressure ring and the oil ring are collectively referred to as "piston rings". An example of the piston rings is disclosed in Japanese Laid-Open Patent Application Publication No. 2008-50649.

Upon movement of the piston, the oil ring also moves in the cylinder. By this movement, the oil ring scrapes off an oil adhering to the inner circumferential face of the cylinder. The oil returns to an oil pan.

Oil rings are broadly classified into two-piece combined oil rings and three-piece combined oil rings. A two-piece combined oil ring includes a main ring (referred to as a "main body") and a coil expander. The main ring includes a pair of rails. The outer circumferential face of each of the rails rubs against the inner circumferential face of a cylinder.

A main ring whose material is a stainless steel is in widespread use. The main ring has been subjected to nitriding. The surface of the main ring is hard. The nitriding contributes to the wear resistance of the main ring.

A main ring whose material is a carbon steel or low-alloy steel is in widespread use. Carbon steels and low-alloy steels have excellent workability. Thus, the main ring can easily be obtained. The main ring has a hard coat. The hard coat can be formed by plating (or coating). The hard coat contributes to the wear resistance of the main ring.

CITATION LIST

Patent Literature

PTL 1: Japanese Laid-Open Patent Application Publication No. 2008-50649

SUMMARY OF INVENTION

Technical Problem

A main ring whose material is a stainless steel requires a high material cost. Since stainless steels have poor workability, it is not easy to obtain the main ring in a complicated shape.

A main ring whose material is a common carbon steel or low-alloy steel is not suitable for nitriding. Thus, the main ring is plated or coated as mentioned above. The plating entails costs such as that for liquid waste treatment. The coating involves a heating step, and the heating causes softening of the main ring.

An object of the present invention is to provide a wire by the use of which a low-cost oil ring having excellent wear resistance can be obtained.

Solution to Problem

An oil ring wire according to the present invention contains an alloy steel as a material.

The alloy steel contains:

0.50 to 0.65% by mass C;
1.60 to 2.30% by mass Si;
0.60 to 1.10% by mass Mn;
0.75 to 1.15% by mass Cr;
0.18 to 0.45% by mass Ni;
0.05 to 0.15% by mass V;
0.15% by mass or less Cu; and
inevitable impurities.

In the oil ring wire, an area percentage of a carbide is more than 6.0% and 10.0% or less.

Preferably, the oil ring wire has a Vickers hardness of 510 to 650.

The oil ring wire may include a body and a pair of rails. Each of the rails projects from the body. Each of the rails includes an edge portion. Preferably, the edge portion has a width of 0.10 mm or less.

Preferably, in the oil ring wire, a grain size index of prior austenitic crystals is 9.0 or more.

In another aspect, a method of producing an oil ring wire includes:

(1) subjecting a basic wire to cold wire drawing and spheroidizing annealing to obtain a thin wire, the basic wire containing an alloy steel as a material, the alloy steel containing to 0.65% by mass C, 1.60 to 2.30% by mass Si, 0.60 to 1.10% by mass Mn, 0.75 to 1.15% by mass Cr, 0.18 to 0.45% by mass Ni, 0.05 to 0.15% by mass V, 0.15% by mass or less Cu, and inevitable impurities;
(2) subjecting the thin wire to cold rolling and spheroidizing annealing to obtain a deformed wire; and
(3) subjecting the deformed wire to quenching and tempering.

With this method, an oil ring wire can be obtained in which an area percentage of a carbide is more than 6.0% and 10.0% or less.

Advantageous Effects of Invention

The alloy steel used as the material of the oil ring wire according to the present invention is inexpensive. The alloy steel has excellent workability. Additionally, the oil ring wire is suitable for nitriding, and this eliminates the need for plating of a main ring or the like obtained from the wire. An oil ring can be obtained from the wire at a low cost.

The oil ring wire contains a carbide. The carbide contributes to the hardness of the main ring or the like. The main ring or the like containing the carbide has excellent softening resistance. The main ring or the like obtained from the wire through a heat treatment has high hardness. The oil ring has excellent wear resistance.

DESCRIPTION OF EMBODIMENTS

The following will describe the present invention in detail based on preferred embodiments with appropriate reference to the drawings.

Figure 1:
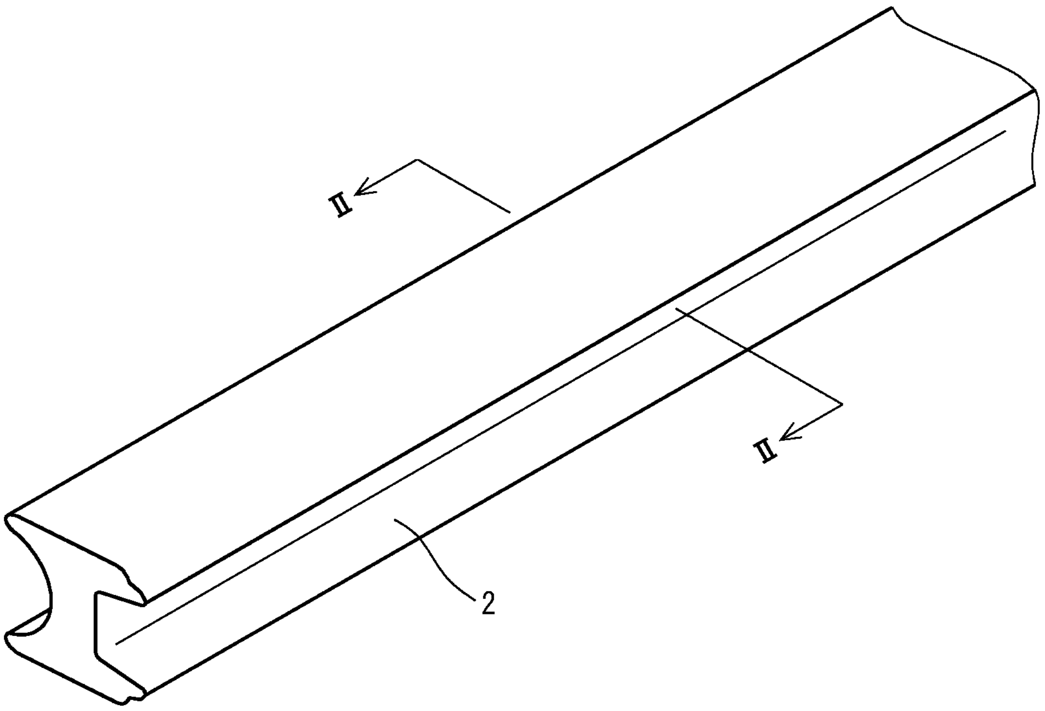
FIG. 1 is a perspective view showing a part of an oil ring wire according to one embodiment of the present invention.
Figure 2:
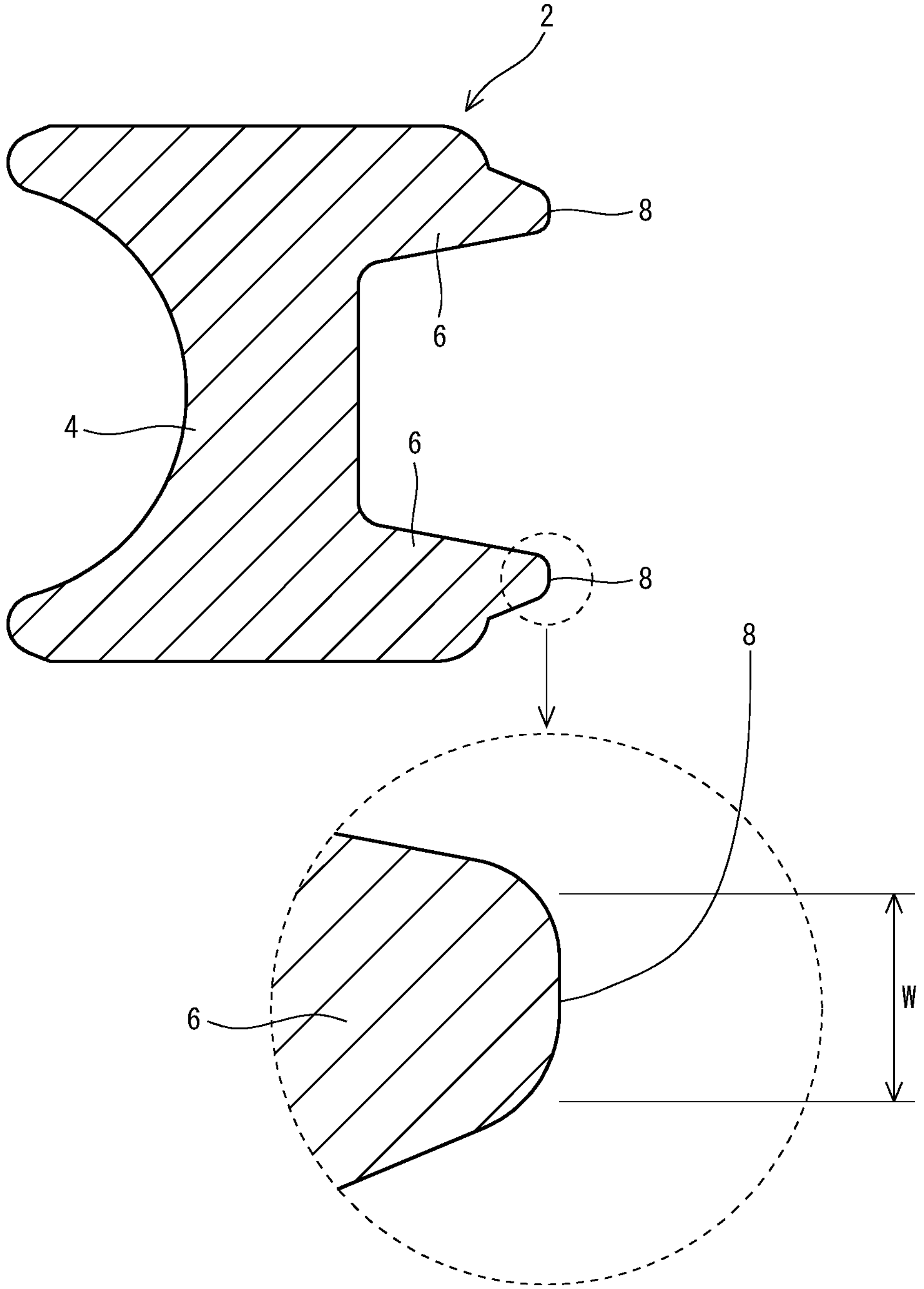
FIG. 2 is an enlarged cross-sectional view taken along the line II-II of FIG. 1.

FIGS. 1 and 2 show an oil ring wire 2. The cross-sectional shape of the oil ring wire 2 is not a circle. In other words, the oil ring wire 2 is a deformed wire. As shown in FIG. 2, the oil ring wire 2 includes a body 4 and a pair of rails 6. Each of the rails 6 includes an edge portion 8.

The oil ring wire 2 contains an alloy steel as a material. The alloy steel contains: 0.50 to 0.65% by mass C; 1.60 to 2.30% by mass Si; 0.60 to 1.10% by mass Mn; 0.75 to 1.15% by mass Cr; 0.18 to 0.45% by mass Ni; 0.05 to 0.15% by mass V; and 0.15% by mass or less Cu. Preferably, the rest of the alloy steel consists of Fe and inevitable impurities. The amount of the alloy elements contained in the alloy steel is relatively small. The material of the oil ring wire 2 is a low-alloy steel. The low-alloy steel is inexpensive.

Figure 3:
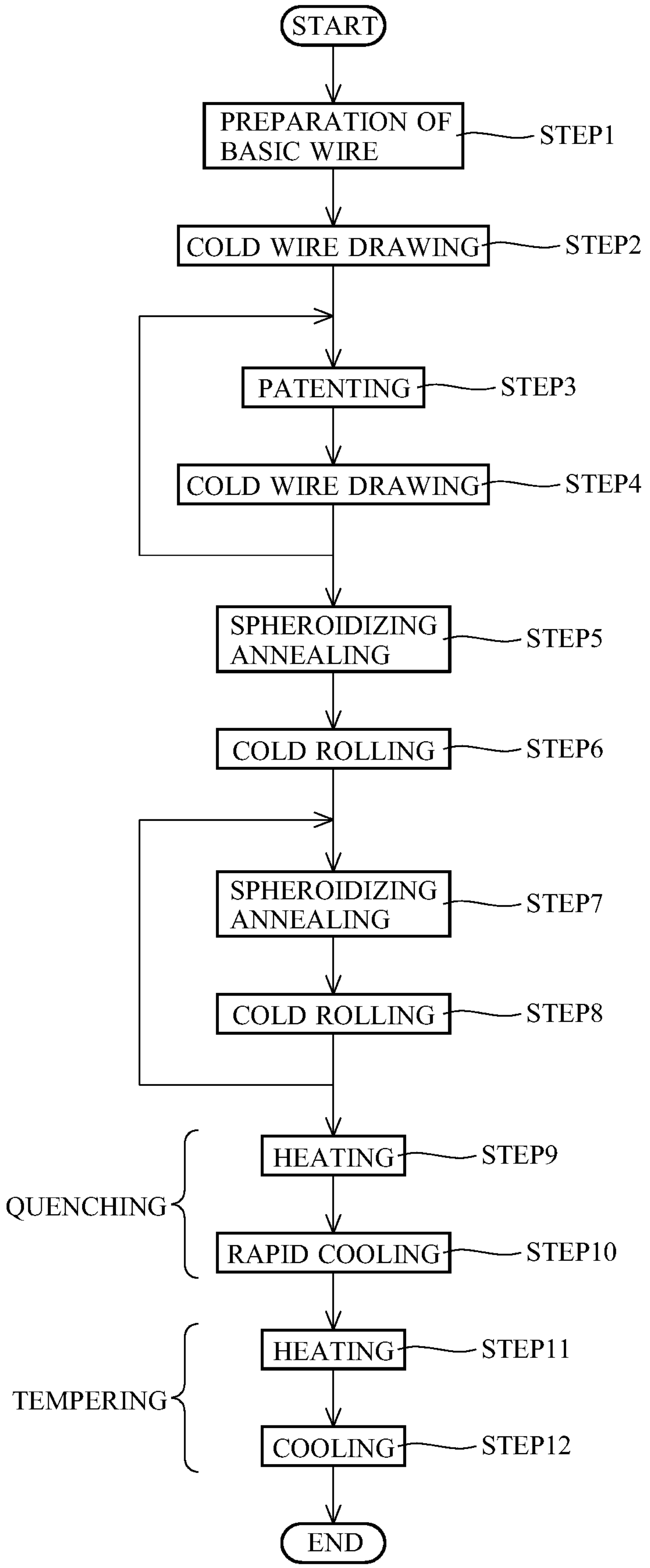
FIG. 3 is a flowchart showing an example of a method of producing the oil ring wire of FIG. 1.

FIG. 3 is a flowchart showing an example of a method of producing the oil ring wire 2 of FIG. 1. In the production method, a basic wire is prepared first (STEP 1). The basic wire is obtained through processes such as steelmaking, refining, casting, hot rolling, and annealing. The cross-sectional shape of the basic wire is a circle. The diameter of the circle is, for example, 6.4 mm.

The wire is subjected to cold wire drawing (STEP 2). In the cold wire drawing, the basic wire gradually decreases in diameter and gradually increases in length. The cross-sectional shape of the wire having undergone the cold wire drawing (STEP 2) is a circle. The diameter of the wire is, for example, 4.5 mm.

The wire is subjected to patenting (STEP 3). The patenting is a heat treatment in which the wire heated into the austenitic region is cooled to give a pearlitic microstructure. The patenting restores the ductility of the wire which was diminished by the cold wire drawing (STEP 2). The cold wire drawing (STEP 2) and the patenting (STEP 3) may be skipped. The wire may be subjected to spheroidizing annealing rather than the patenting (STEP 3).

The wire is further subjected to cold wire drawing (STEP 4). In the cold wire drawing, the wire gradually decreases in diameter and gradually increases in length. The cross-sectional shape of the wire having undergone the cold wire drawing (STEP 4) is a circle. The diameter of the wire is, for example, 3.0 mm. The patenting (STEP 3) and the cold wire drawing (STEP 4) may be repeated if necessary.

The wire is subjected to spheroidizing annealing (STEP 5) to obtain a thin wire. The spheroidizing annealing leads to formation of a spheroidal carbide in the thin wire. The spheroidizing annealing restores the ductility of the thin wire which was diminished by the cold wire drawing (STEP 4). In view of obtaining a sufficient amount of spheroidal carbide, the holding temperature in the spheroidizing annealing (STEP 5) is preferably 700° C. or higher, more preferably 730° C. or higher, and particularly preferably 750° C. or higher. From the same viewpoint, the holding time in the spheroidizing annealing (STEP 5) is preferably 4.0 hours or more, more preferably 4.3 hours or more, and particularly preferably 4.5 hours or more.

The thin wire is subjected to cold rolling (STEP 6). A deformed wire is obtained by the cold rolling. The cross-sectional shape of the deformed wire is not a circle. For example, the deformed wire has a thickness of 2.2 mm and a width of 2.2 mm.

The deformed wire is subjected to spheroidizing annealing (STEP 7). The spheroidizing annealing (STEP 7) causes growth of the spheroidal carbide formed in the previous spheroidizing annealing (STEP 5). Additionally, the spheroidizing annealing (STEP 7) leads to formation of a further spheroidal carbide. The spheroidizing annealing (STEP 7) restores the ductility of the deformed wire which was diminished by the cold rolling (STEP 6). In view of growing the spheroidal carbide sufficiently or obtaining a sufficient amount of spheroidal carbide, the holding temperature in the spheroidizing annealing (STEP 7) is preferably 700° C. or higher, more preferably 730° C. or higher, and particularly preferably 750° C. or higher. From the same viewpoint, the holding time in the spheroidizing annealing (STEP 7) is preferably 4.0 hours or more, more preferably 4.3 hours or more, and particularly preferably 4.5 hours or more.

The wire is further subjected to cold rolling (STEP 8). The cold rolling changes the cross-section of the deformed wire. For example, the deformed wire having undergone the cold rolling (STEP 8) has a thickness of 2.0 mm and a width of 2.0 mm. The spheroidizing annealing (STEP 7) and the cold rolling (STEP 8) may be repeated if necessary.

The deformed wire is subjected to quenching. In the quenching, the deformed wire is heated first (STEP 9). In the heating, the temperature of the deformed wire reaches the austenitic region. The deformed wire is then rapidly cooled (STEP 10). Preferably, the deformed wire is cooled in an oil. The deformed wire having undergone the quenching has a martensitic structure.

The deformed wire is subjected to tempering. In the tempering, the deformed wire is heated first (STEP 11). The deformed wire is then cooled (STEP 12). The oil ring wire 2 shown in FIG. 1 is obtained by the tempering.

Figure 4:
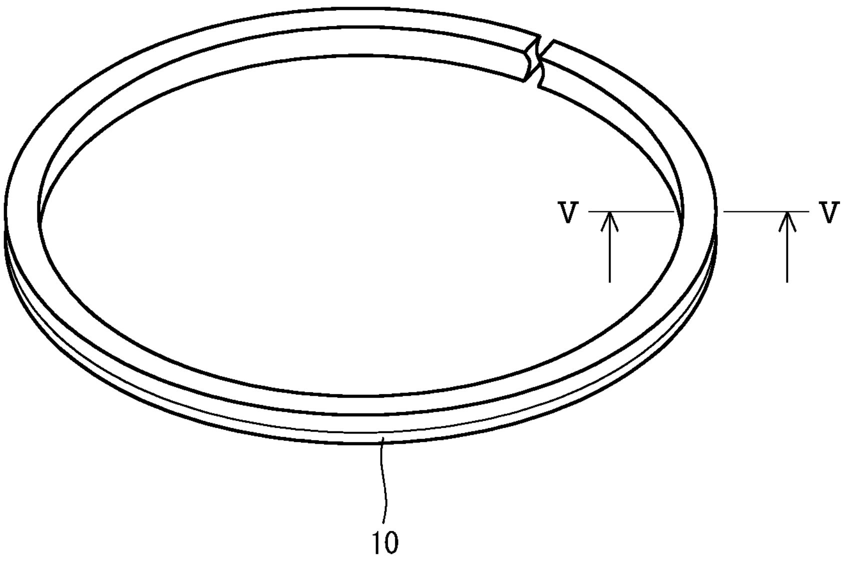
FIG. 4 is a perspective view showing a main ring obtained from the oil ring wire of FIG. 1.
Figure 5:
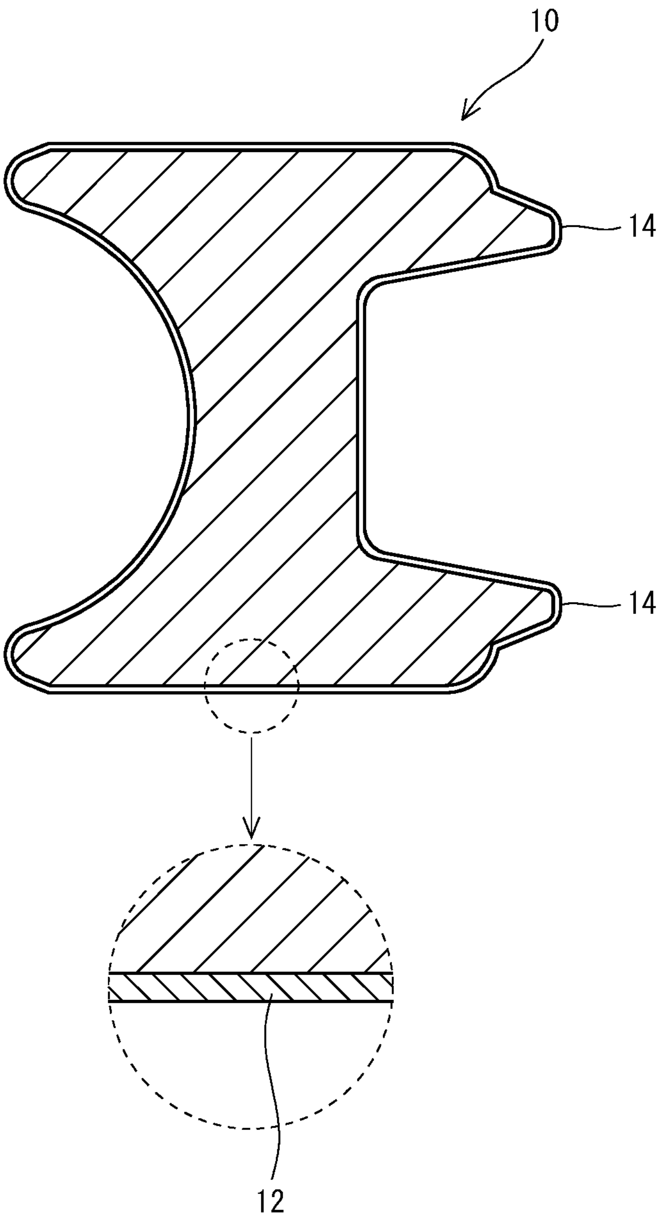
FIG. 5 is an enlarged cross-sectional view taken along the line V-V of FIG. 4.

The oil ring wire 2 is subjected to coiling to obtain a coil. The coil is subjected to a stress relief heat treatment. The coil is further subjected to nitriding. In the nitriding, the coil is held in an environment with a high temperature (e.g., 500° C.). A main ring 10 shown in FIGS. 4 and 5 is obtained by the nitriding. As shown in FIG. 5, the main ring 10 includes a hard layer 12 resulting from the nitriding and located in the vicinity of the surface of the main ring 10. The hard layer 12 extends over the entirety of the main ring 10. The hard layer 12 contains a nitride. Instead of the nitriding, means such as physical vapor deposition or ion plating may be used to form the hard layer 12. As shown in FIG. 5, the main ring 10 includes a pair of outer circumferential faces 14.

Figure 6:
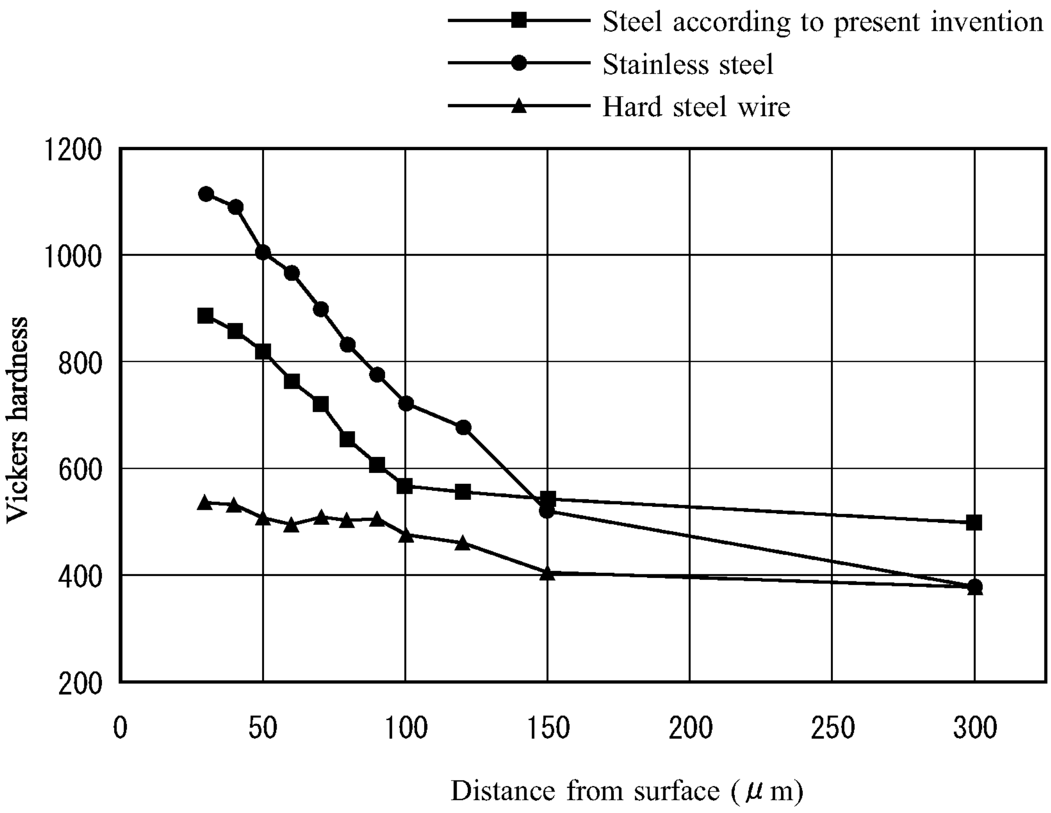
FIG. 6 is a graph showing the Vickers hardness of a nitrided layer of the main ring of FIG. 4.

FIG. 6 shows the relationship of Vickers hardness (load: 50 gf) versus depth from surface for the main ring 10 having undergone the nitriding. The Vickers hardness required of the main ring 10 is 700 or more. As is clear from the graph of FIG. 6, the main ring 10 obtained from the oil ring wire 2 according to the present invention exhibits a Vickers hardness of 700 or more in a region from a depth of zero to a depth of 70 μm. The oil ring wire 2 according to the present invention is more suitable for nitriding than low-alloy steels (such as hard steel wires).

Figure 7:
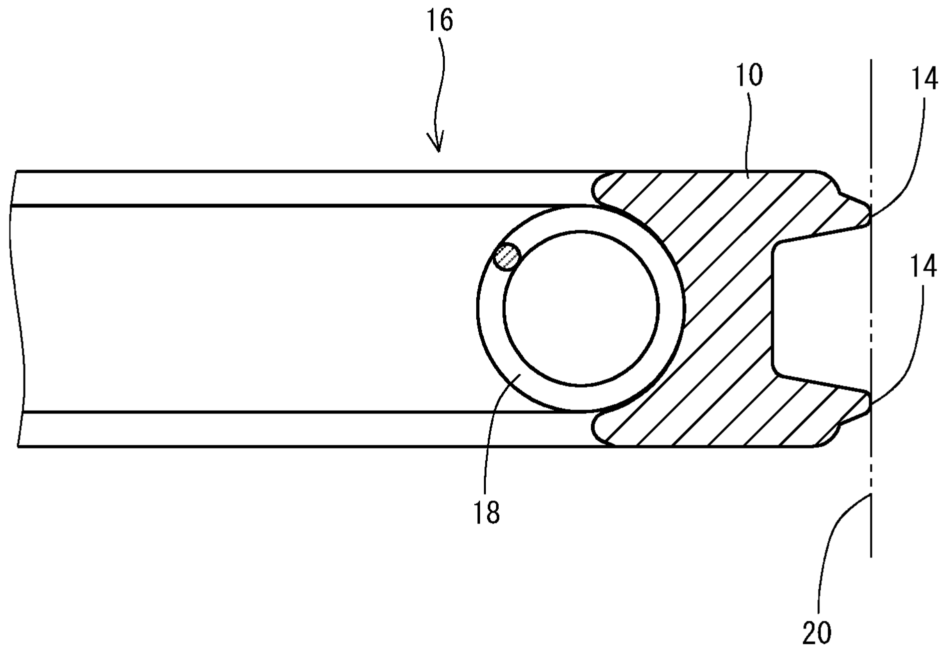
FIG. 7 is a cross-sectional view showing a part of an oil ring including the main ring of FIG. 4.

FIG. 7 is a cross-sectional view showing a part of an oil ring 16 including the main ring 10 of FIG. 4. The oil ring 16 includes the main ring 10 and a coil expander 18. The oil ring 16 is referred to as a two-piece combined oil ring. In FIG. 7, the reference sign 20 denotes the inner circumferential face of a cylinder. Each of the outer circumferential faces 14 of the main ring 10 is in contact with the inner circumferential face 20.

The outer circumferential face 14 of the main ring 10 shown in FIG. 5 reflects the shape of the edge portion 8 of the oil ring wire 2 shown in FIG. 2. As previously stated, the material of the oil ring wire 2 is a low-alloy steel. The low-alloy steel has excellent workability. Thus, the edge portion 8 can easily be formed by cold rolling (STEP 6 and STEP 8). The main ring 10 obtained from the oil ring wire 2 need not be subjected to a cumbersome finishing process. The main ring 10 can be obtained from the oil ring wire 2 at a low cost.

As shown in FIG. 2, two corners of the edge portion 8 are rounded. In FIG. 2, the arrow W represents the width of the edge portion 8. The width W is the distance between the two corners as assumed to be not rounded. The width W is preferably 0.10 mm or less. The main ring 10 whose outer circumferential face 14 has a small width can be obtained from the oil ring wire 2 having a width W of 0.10 mm or less. The main ring 10 exerts a high pressure on the inner circumferential face 20 of the cylinder when in contact with the inner circumferential face 20. The oil ring 16 including the main ring 10 scrapes off the oil satisfactorily. A basic wire made of a high-alloy steel is difficult to work into the oil ring wire 2 having a width W of 0.10 mm or less. In the present invention, the material (i.e., a low-alloy steel) of the basic wire enables the basic wire to be worked into the oil ring wire 2 having a width W of 0.10 mm or less.

As described in detail later, the alloy elements enable nitriding of the main ring 10. This eliminates the need for plating of the main ring 10. The main ring 10 can be obtained at a low cost.

In production of the oil ring wire 2, as previously stated, the wire ductility is diminished by cold wire drawing but restored by spheroidizing annealing. The deformed wire obtained through the spheroidizing annealing contains a large amount of spheroidal carbide. Quenching of the deformed wire (STEP 9 and STEP 10) causes some of the C atoms of the spheroidal carbide to form a solid solution with the matrix. However, the majority of the C atoms remain a constituent of the spheroidal carbide. The oil ring wire 2 contains a large amount of spheroidal carbide. The spheroidal carbide remains also in the main ring 10 having undergone the nitriding. The spheroidal carbide has high hardness. The spheroidal carbide contributes to the high hardness of the main ring 10. The main ring 10 containing the spheroidal carbide has excellent wear resistance.

If excess thermal energy is applied to the deformed wire in heating during quenching (STEP 9), the majority of the C atoms contained in the spheroidal carbide form a solid solution with the matrix. The solid solution formation results in a decrease in the amount of the spheroidal carbide contained in the oil ring wire 2. In other words, an area percentage Ps of the spheroidal carbide in the oil ring wire 2 is negatively correlated with the thermal energy applied to the deformed wire in heating during quenching (STEP 9). Thus, the area percentage Ps is negatively correlated with the grain size of the deformed wire having undergone the quenching and positively correlated with the grain boundary area of the deformed wire having undergone the quenching. In the oil ring wire 2 with an extremely low area percentage Ps, the grain boundary area is small, and for this reason the coiling induces a stress concentrating on the grain boundaries. At the grain boundaries, the diffusion of the C atoms is promoted to cause precipitation of a further carbide. In the main ring 10 containing the carbide, the content of the C atoms in the matrix is low. The hardness of the main ring 10 is not sufficient. The main ring 10 is inferior in wear resistance.

In view of the wear resistance of the main ring 10, the area percentage Ps of a carbide in the oil ring wire 2 is preferably more than 6.0%, more preferably 6.5% or more, and particularly preferably 7.0% or more.

In the deformed wire where the carbide content is not excessively high, a sufficient amount of C atoms form a solid solution with the matrix. The hardness of the deformed wire having undergone the quenching (STEP 9 and STEP 10) is high. In the tempering of the deformed wire having high hardness, heating at a high temperature (STEP 12) can be employed. When a coil formed from the oil ring wire 2 obtained through the tempering including high-temperature heating is subjected to a stress relief heat treatment, the hardness does not decrease significantly. In other words, the oil ring wire 2 has excellent softening resistance. The main ring 10 obtained from the oil ring wire 2 has high hardness. Thus, the main ring 10 has excellent wear resistance.

In view of the wear resistance of the main ring 10, the area percentage Ps of a carbide in the oil ring wire 2 is preferably 10.0% or less, more preferably 9.5% or less, and particularly preferably 9.0% or less.

The measurement of the area percentage Ps of a carbide is performed using image analysis software named "Image J". In the measurement, a cross-section of the oil ring wire 2 is imaged with a scanning electron microscope, and a SEM photograph is obtained at a magnification of 3000 times. An image file of the photograph is binarized by the above-mentioned image analysis software, and zones occupied by carbide particles are differentiated from other zones by color coding. The area of each of the carbide particles is calculated. A circle having the same area as the carbide particle of interest is assumed, and the diameter of the circle is determined as the diameter of the particle. The diameter and number of carbide particles having a diameter of 0.05 μm or more are sorted into a histogram. Carbide particles having a diameter of less than 0.05 μm are excluded from counting. The total area of the carbide particles having a diameter of 0.05 μm or more is calculated based on the histogram. The percentage of the total area to the area of the entire photograph is the area percentage Ps. In other words, the area percentage Ps is the percentage of an area occupied by a particulate carbide (including a spheroidal carbide).

In view of achieving the area percentage Ps which is not excessively high, the temperature in the quenching (STEP 9) is preferably 950° C. or higher and particularly preferably 980° C. or higher. In view of achieving the area percentage Ps which is not excessively low, the temperature is preferably 1050° C. or lower.

In the quenching, the deformed wire is heated to a high temperature (STEP 9) and then rapidly cooled (STEP 10). The metallographic structure of the deformed wire at the high temperature is austenite. The metallographic structure has austenitic grains. The deformed wire is rapidly cooled. The rapid cooling transforms the metallographic structure into martensite. The rapid cooling induces preferential precipitation of a compound at the boundaries of the austenitic grains. The austenitic crystals present before the rapid cooling (prior austenitic crystals) influence the martensitic structure. The trace of the prior austenitic crystals can be observed in the martensite.

In the oil ring wire 2, the grain size index of the prior austenitic crystals is preferably 9.0 or more. In other words, the prior austenitic crystals are fine. The main ring 10 obtained from the oil ring wire 2 has excellent fatigue resistance. In view of this fact, the grain size index is more preferably 9.5 or more and particularly preferably 10.0 or more. The grain size index is measured according to "JIS G 0551:2020". A photograph of the cross-section as shown in FIG. 2 is obtained by microscope observation at a magnification of 100 times and compared to the grain size standard chart. A grain size index of 9.0 or more can be achieved by preventing overheating during the quenching.

The Vickers hardness Hv of the oil ring wire 2 is preferably 510 or more. The oil ring wire 2 can maintain sufficient hardness even after having been subjected to a heat treatment or nitriding. The main ring 10 having excellent wear resistance can be obtained from the oil ring wire 2. In view of this fact, the Vickers hardness is more preferably 530 or more and particularly preferably 560 or more. In view of the ease of coiling, the Vickers hardness of the oil ring wire 2 is preferably 650 or less. The Vickers hardness is measured according to "JIS Z 2244". A load of 10 kgf is applied to the oil ring wire 2 in the measurement of the Vickers hardness.

A conventional high-alloy steel able to undergo nitriding has a high Vickers hardness, which can give rise to break of the high-alloy steel during coiling. The low-alloy steel of the oil ring wire 2 according to the present invention has excellent workability despite being able to undergo nitriding. The oil ring wire 2 can have both a high Vickers hardness and high workability. The main ring 10 having excellent wear resistance can be obtained from the oil ring wire 2 at a low cost.

As previously stated, physical vapor deposition (PVD) may be employed instead of nitriding. The physical vapor deposition results in formation of a hard coat. The coat is formed around the outer circumferential faces 14. The coat can reduce wear of the main ring 10 which arises from rubbing of the main ring 10 against the inner circumferential face 20 of the cylinder. No coat is formed on the rest of the surface of the main ring 10. A non-coated portion of the main ring 10 is placed in contact with a piston. As previously stated, the main ring 10 has undergone a stress relief heat treatment. The main ring 10 has further undergone physical vapor deposition. Despite such a heat history, the main ring 10 has sufficient hardness since the oil ring wire 2 according to the present invention has excellent softening resistance. Thus, wear of the main ring 10 is reduced even though the non-coated portion is in contact with the piston. Even if the internal combustion engine is used for a long period of time, the piston is less likely to suffer from movement abnormality due to wear of the main ring 10. The main ring 10 can contribute to reducing the oil consumption.

The following will describe in detail the roles of the elements contained in the low-alloy steel of the oil ring wire 2 according to the present invention.

[Carbon (C)]

C forms a solid solution with the matrix. A suitable amount of C contributes to the hardness and fatigue resistance of the oil ring wire 2. Additionally, the presence of C leads to formation of a carbide. The carbide contributes to the wear resistance of the oil ring wire 2. In view of these facts, the content of C is preferably 0.50% by mass or more, more preferably 0.53% by mass or more, and particularly preferably 0.55% by mass or more. Excess C diminishes the cold workability of the alloy steel. In view of the cold workability, the content of C is preferably 0.65% by mass or less.

[Silicon (Si)]

Si contributes to the high-temperature endurance and softening resistance of the oil ring wire 2. In view of this fact, the content of Si is preferably 1.60% by mass or more, more preferably 1.80% by mass or more, and particularly preferably 2.00% by mass or more. Excess Si diminishes the cold workability, toughness, and quenchability of the alloy steel. In view of this fact, the content of Si is preferably 2.30% by mass or less.

[Manganese (Mn)]

Mn functions as a deoxidizer during melting production of the low-alloy steel. Additionally, Mn reduces the adverse effect of S contained as an impurity. In view of these facts, the content of Mn is preferably 0.60% by mass or more, more preferably 0.80% by mass or more, and particularly preferably 0.90% by mass or more. In view of the cold workability of the alloy steel, the content of Mn is preferably 1.10% by mass or less.

[Chromium (Cr)]

Cr binds to nitrogen in nitriding. Cr enables nitriding of the oil ring wire 2. The hard layer 12 obtained as a result of nitriding contributes to the wear resistance of the main ring 10. Additionally, Cr binds to C to form a carbide. The carbide contributes to the wear resistance of the main ring 10. In view of these facts, the content of Cr is preferably 0.75% by mass or more, more preferably 0.85% by mass or more, and particularly preferably 0.90% by mass or more. Excess Cr impairs the cold workability of the alloy steel. Additionally, excess Cr can give rise to break of the oil ring wire 2 during coiling. In view of the cold workability and the prevention of break, the content of Cr is preferably 1.15% by mass or less.

[Nickel (Ni)]

Ni forms a solid solution with the matrix and contributes to the toughness of the oil ring wire 2. In view of this fact, the content of Ni is preferably 0.18% by mass or more, more preferably 0.25% by mass or more, and particularly preferably 0.30% by mass or more. Excess Ni leads to formation of retained austenite in the oil ring wire 2 having undergone quenching. The retained austenite can give rise to a low hardness of the main ring 10. Additionally, the retained austenite causes a change in the dimensions of the main ring 10 over time. In view of reducing the formation of retained austenite, the content of Ni is preferably 0.45% by mass or less.

[Vanadium (V)]

V binds to nitrogen in nitriding. V enables nitriding of the oil ring wire 2. The hard layer 12 obtained as a result of nitriding contributes to the wear resistance of the main ring Additionally, V contributes to refinement of the metallographic structure. In view of these facts, the content of V is preferably 0.05% by mass or more, more preferably 0.08% by mass or more, and particularly preferably 0.10% by mass or more. In view of the cold workability and hot workability of the alloy steel, the content of V is preferably 0.15% by mass or less.

[Copper (Cu)]

Cu contributes to toughness during cold working. In view of this fact, the content of Cu is preferably 0.05% by mass or more, more preferably 0.08% by mass or more, and particularly preferably 0.10% by mass or more. In view of the hot workability of the alloy steel, the content of Cu is preferably 0.15% by mass or less. Cu is not an essential element. Thus, the content of Cu may be substantially zero.

[Iron (Fe)]

Fe is a major component of the low-alloy steel. Fe is a base metal of the matrix. The low-alloy steel has high strength and excellent toughness. The content of Fe is preferably 85% by mass or more, more preferably 90% by mass or more, and particularly preferably 93% by mass or more.

[Inevitable Impurities]

The low-alloy steel can contain impurities. A typical impurity is P. P segregates at the grain boundaries. P impairs the toughness of the alloy steel. In view of the toughness, the content of P is preferably 0.02% by mass or less. Another typical impurity is S. S binds to another element to form an inclusion. S impairs the toughness of the alloy steel. In view of the toughness, the content of S is preferably 0.02% by mass or less.

EXAMPLES

Hereinafter, the effect of the present invention will be demonstrated by examples. The present invention should not be restrictively interpreted based on the description of the examples.

Example 1

Figure 8:
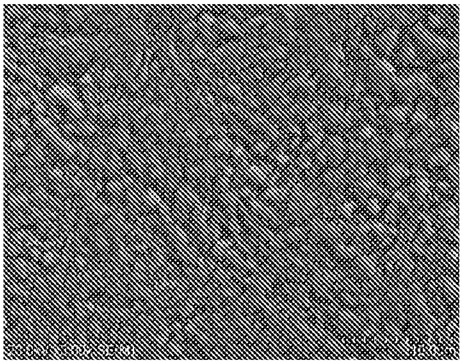
FIG. 8 is a microscope photograph showing the metallographic structure of an oil ring wire according to Example 1 of the present invention.

An oil ring wire of Example 1 was obtained by the method shown in FIG. 3. The heating temperature in the quenching was 980° C. The tempering temperature was adjusted as appropriate to give a preferred hardness. The material of the oil ring wire was a low-alloy steel. The low-alloy steel contained 0.59% by mass C, 2.05% by mass Si, 0.76% by mass Mn, 1.00% by mass Cr, 0.22% by mass Ni, 0.09% by mass V, and 0.01% by mass Cu. The rest of the low-alloy steel consisted of Fe and inevitable impurities. The metallographic structure of the oil ring wire is shown in FIG. 8. The area percentage Ps of the oil ring wire was 6.4%. The Vickers hardness (load: 10 kgf) of the oil ring wire was 589.

Examples 2 and 3 and Comparative Examples 1 and 2

Oil ring wires of Examples 2 and 3 and Comparative Examples 1 and 2 were obtained using quenching temperatures as shown in Table 1 below.

[Heat Treatment]

A coil was formed from each of the oil ring wires. The coil was held at a temperature of 450° C. for 30 minutes and then cooled slowly. The conditions of this heat treatment correspond to the conditions of a stress relief heat treatment which is commonly carried out in production of main rings. The Vickers hardness (load: 10 kgf) of the heat-treated coil was measured. The results are shown in Table 1 below.

TABLE 1

| Evaluation results | | | | | |
|---|---|---|---|---|---|
| | Comp. Ex. 1 | Ex. 1 | Ex. 2 | Ex. 3 | Comp. Ex. 2 |
| Quenching temperature (° C.) | 1080 | 980 | 950 | 1050 | 880 |
| Ps (%) | 5.1 | 6.4 | 8.9 | 6.2 | 11.8 |
| Hardness (Hv) | 584 | 589 | 591 | 587 | 586 |
| Hardness measured after heat treatment (Hv) | 441 | 489 | 477 | 465 | 436 |

The Vickers hardness required of main rings is 450 or more. As shown in Table 1, the Vickers hardness measured after the heat treatment was more than 450 for the oil ring wires according to Examples. The evaluation results demonstrate the superiority of the present invention.

INDUSTRIAL APPLICABILITY

The oil ring wire according to the present invention can be used as a material for piston rings of various internal combustion engines.

REFERENCE SIGNS LIST

2 oil ring wire
4 body
6 rail
8 edge portion
10 main ring
12 hard layer
14 outer circumferential face
16 oil ring
18 coil expander
20 inner circumferential face of cylinder

The invention claimed is:

1. An oil ring wire comprising an alloy steel as a material, wherein the alloy steel comprises:
- 0.50 to 0.65% by mass C;
- 1.60 to 2.30% by mass Si;
- 0.60 to 1.10% by mass Mn;
- 0.75 to 1.15% by mass Cr;
- 0.18 to 0.45% by mass Ni;
- 0.05 to 0.15% by mass V; and
- 0.15% by mass or less Cu;
- the rest of the alloy steel consists of Fe and inevitable impurities, and
- an area percentage of a carbide is more than 6.0% and 10.0% or less.

2. The oil ring wire according to claim 1, having a Vickers hardness of 510 to 650.

3. The oil ring wire according to claim 1, comprising a body and a pair of rails, wherein
- each of the rails projects from the body and includes an edge portion, and
- the edge portion has a width of 0.10 mm or less.

4. The oil ring wire according to claim 1, wherein a grain size index of prior austenitic crystals is 9.0 or more.

* * * * *